Feb. 18, 1969  A. ARNAO, JR  3,428,936
SAFETY COVER FOR AN ELECTRICAL OUTLET RECEPTACLE
Filed Sept. 1, 1967
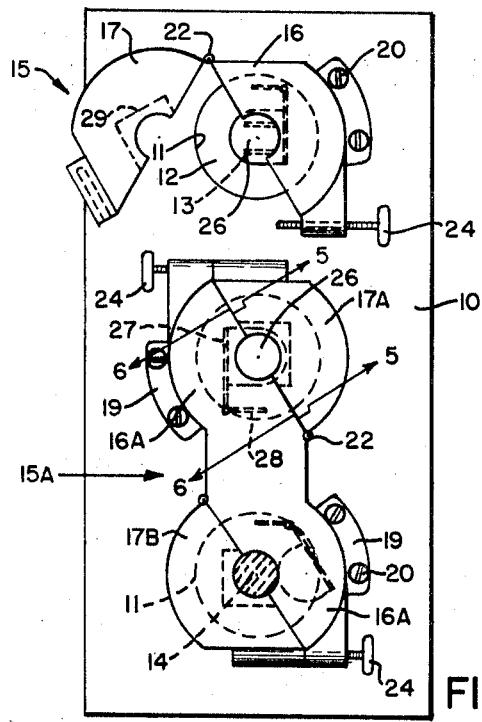
FIG.1
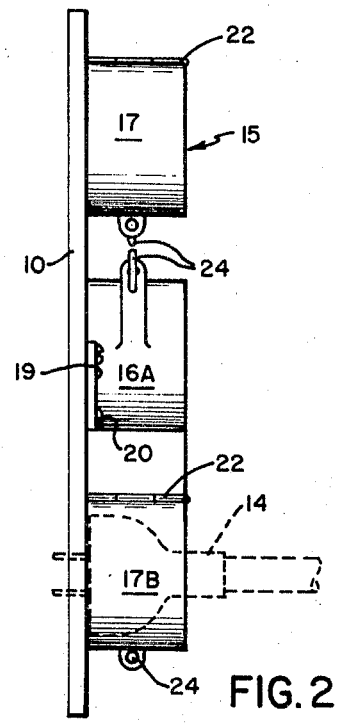
FIG.2
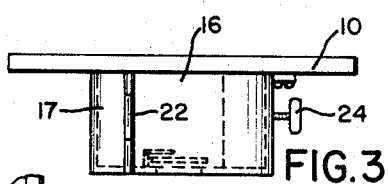
FIG.3
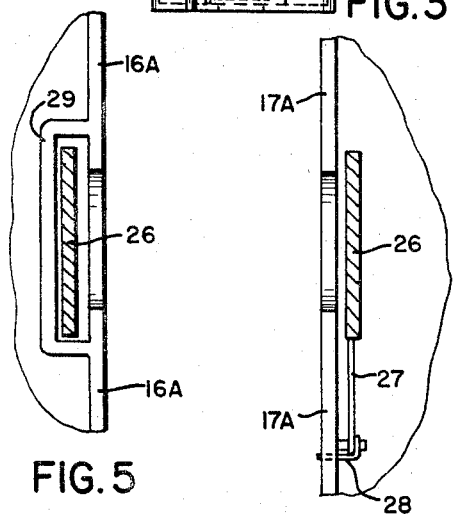
FIG.5
FIG.6
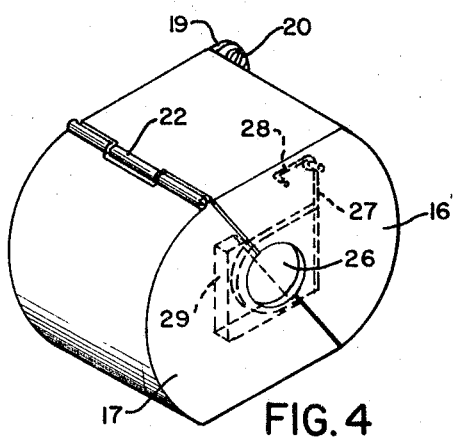
FIG.4
INVENTOR.
ALBERT ARNAO, JR.
BY
Arthur F. Robert
ATTORNEY

United States Patent Office 3,428,936
Patented Feb. 18, 1969

3,428,936
SAFETY COVER FOR AN ELECTRICAL OUTLET RECEPTACLE
Albert Arnao, Jr., 3920 Laurie St.,
Jacksonville, Fla. 32206
Filed Sept. 1, 1967, Ser. No. 665,033
U.S. Cl. 339—39          2 Claims
Int. Cl. H01r *13/44, 13/54*

ABSTRACT OF THE DISCLOSURE

A dome-shaped safety cover is mounted on an escutcheon plate over a plate aperture which receives or exposes an electrical outlet receptacle having plug-in openings to receive the prongs of an electrical plug. The cover is composed of complementary halves, which cooperate to provide it with an open mouth at its inner end to encircle said plate aperture, with an interior large enough to house a plug having its prongs in the receptacle openings and with a smaller outer end opening to accommodate the cord of a housed plug. One half of the cover is hinged for movement toward and away from the other half between a cover-closed position, in which the cover may house a plug, to a cover-open position in which a plug to be housed may be inserted into the cover and plugged into the receptacle or removed therefrom. The hinged half is releasably secured in the cover-closed position. A biased disc normally closes the outer end opening of a closed unoccupied cover to prevent access to its interior.

BACKGROUND OF THE INVENTION

Field of the invention

This invention relates to a safety cover which is mounted on an escutcheon or wall plate to extend over an aperture formed in the plate to receive or expose an electrical outlet receptacle having openings for receiving the prongs of an electrical plug.

Description of the prior art

The prior art recognizes: that electrical connectors—of the type composed of an electrical plug having projecting prongs, an electrical wall outlet receptacle having plug-in openings to receive said prongs and a wall-mounted escutcheon plate having an aperture to receive or expose the receptacle—involved many hazards, particularly to innocents; and that these hazards may be substantially reduced and possibly eliminated by providing the wall plate with a cover which encloses the receptacle-plug connection while permitting the plug to be removed and replaced safely. By "innocents," I mean children too young to distinguish between safe and hazardous devices. Safety covers to protect the innocent, are disclosed in various patents. Thus Patents 2,489,900 and 2,934,591 both provide integral covers with spring biased obstructions which restrict access to the interior of the cover, while Patents 2,761,112 and 2,987,690 both provide covers composed of complementary parts, which, when secured together with a plug in place, prevent access to the electrical connection.

Objects of the invention

The principal objects of the present invention are: to provide a safety cover of the complementary parts type, the parts of which may be easily and quickly mounted on an escutcheon plate in a "permanent" manner which does not require the removal of any part during plug-receiving and plug-removing operations; to provide a safety cover which, when mounted on the escutcheon plate, will normally provide a positive obstruction preventing an innocent from having access to the interior of the cover regardless of whether it is occupied by a plug or not; and to provide a safety cover which, when mounted on an escutcheon plate, may be easily and quickly operated by persons, other than innocents, either to receive a plug or to permit its removal.

Another important object is to accomplish one or more, and preferably all, of the principal objects in a simply, sturdily and inexpensively constructed safety cover of the complementary parts type.

Statement of the invention

All of the objects of this invention can be achieved in a 4-element safety cover, which is particularly suited for use on an escutcheon or wall plate having an aperture for exposing an electrical outlet receptacle which has openings to receive the prongs of an electrical plug and which comprises: (A) means forming complementary "halves" of a dome-shaped cover, having inner and outer ends, (1) each half cooperating with the other to provide the cover (a) with an interior large enough to house a plug having its prongs in said receptacle openings, (b) with an open mouth at its inner end, and (c) with a smaller outer-end opening to accommodate the cord of a housed plug; (B) means for mounting said cover on said plate with its open mouth end adjacent said plate aperture, said means including (1) means for mounting one of said complementary "halves" firmly on said plate, and (2) means hingedly mounting the other complementary half for movement (a) from a cover-closed position, in which it may house a plug and its mouth encircles said plate aperture, (b) to a cover-open position, in which a plug to be housed may be plugged into an exposed outlet receptacle or removed therefrom; (C) cover-locking means for releasably securing the hinged half in said cover-closed position; and (D) outer end-closure means normally closing the outer end opening of the cover when it is closed and unoccupied by a plug.

Brief description of the drawings

The invention is illustrated in the accompanying drawings wherein:

FIG. 1 is a plan view of one single-plug and one double-plug safety cover mounted on an escutcheon plate for three outlet receptacles, the single-plug cover being open and unoccupied by a plug and the double-plug cover being closed but occupied by one plug only;

FIG. 2 is a side elevational view corresponding to one looking toward the left side of FIG. 1 with all covers closed, this view showing the plug and cord of the occupied cover in dotted lines;

FIG. 3 is an end elevational view of FIG. 2 looking toward the top end thereof;

FIG. 4 is a perspective of the single plug safety cover shown in FIGS. 1–3; and

FIGS. 5 and 6 are sections taken along lines 5—5 and 6—6 of FIG. 1.

Description of the preferred embodiment

The drawings illustrate the preferred embodiment in both single-plug and double-plug safety cover forms. In FIGS. 1 and 2, both forms are mounted on a metal or plastic escutcheon plate 10 having a series of three apertures 11 exposing a corresponding series of outlet receptacles 12, each of which conventionally has plug-in openings 13 to receive the prongs of an electrical plug 14. Each form of safety cover comprises four elements, namely: a dome-shaped cover; cover mounting means; hinged cover locking means; and outer end closure means.

Dome-shaped cover

In the single-plug form, my dome-shaped cover 15, which has inner and outer ends, is composed of suitable material (plastic or metal) forming complementary "halves" 16 and 17. Each half 16 of the cover 15 cooperates with the other half 17 to provide the cover (a) with an interior large enough for plug insertion, housing and removal purposes, (b) with an open mouth at its inner end, and (c) with a smaller outer-end opening to accommodate the electrical cord of a housed plug 14.

Each part of the single-plug form of cover does not necessarily provide one half of either the entire cover or the entire interior of the cover. Each part of the single-plug form of the cover is designated as a complementary "half" because, in most (if not all) embodiments, it will not only provide one half of the open mouth at the inner end of the cover and one half of the cord-accommodating opening at the outer end of the cover, but also encircle one half of at least one plate aperture 11.

In the double-plug form, my dome-shaped cover 15A is composed of three parts, namely: a mounted part 16A; a hinged part 17A at one end of the mounted part; and a hinged part 17B at the opposite end of the mounted part. Here, the mounted part 16A cooperates with the hinged part 17A to provide one cover with the following: (a) the requisite interior; (b) an open mouth at its inner end, this mouth extending at least substantially (although not completely) around the adjacent plate aperture 11; and (c) the requisite cord-accommodating opening at its outer end. The same cooperation exists between mounted part 16A and the other hinged part 17B.

Cover mounting means

In the single-plug form, the means for mounting the dome-shaped cover 15 on the plate 10, with its open mouth end adjacent the plate aperture 11, includes: means for mounting one complementary "half" 17 for movement toward and away from the mounted "half" 16 between a cover-closed position, in which it may house a plug 14 and its mouth completely encircles the plate aperture 11, to a cover-open position in which a plug 14 to be housed may be plugged into an exposed outlet receptacle or removed therefrom.

The complementary half 16 may be formed integrally with plate 10. It may be mounted on plate 10 in any other suitable manner, such as that shown wherein the mounted part 16 is provided with a securing flange 19 which is secured to plate 10 through screws 20. The other complementary half 17 may be hingedly mounted directly on the plate 10. Preferably it is hinged at 22 to the mounted half 16 for requisite opening-closing movement.

In the double-plug form, the same general mounting means may be employed to mount part 16A firmly on the plate and to hinge parts 17A and 17B to the mounted part 16A.

Hinged cover locking means

The hinged cover 17 may be releasably secured in the cover closed position in any suitable manner as by providing either "half" with a suitably threaded opening to receive a locking screw 24 mounted on the other half. Preferably the hinged screw 24 is mounted on the fixed or stationary half 16. In the double-plug form, the stationary part 16A carries a pair of locking screws 24, one for each of the hinged parts 17A and 17B.

Outer end closure means

The outer end closure means, which normally closes the cord-accommodating opening at the outer end of the closed cover, when the cover is unoccupied by a plug, comprise: a disc 26 carried by arm 27, which is pivotally mounted on the mounted half 16 of the cover for movement between an operative position, in which it closes (or, for all practical purposes, completely obstructs) the cord-accommodating opening, to an out-of-the-way position at one side of that opening. A spring 28 urges the arm 27 toward its operative position, in which disc 26 not only closes the cord-accommodating opening but also projects over a pocket-forming stop member 29 mounted on the hinged part to prevent the disc 26 from being pushed inwardly. In the double-plug form, the same outer end closure means preferably is employed with the part 16A carrying a pair of disc-arm-spring assemblies 26-28, one at each end of the mounted part 16A.

Operation

The foregoing description of the structure of both forms of my safety plug should make the operation of each form clear; hence a brief description of operation should suffice. A single-plug form of cover 15 is mounted on a plate 10 through its securing flange 19 and screws 20. The hinged half 17 of the cover is first released from locking screw 24 and then swung to its open position. As an electrical plug 14 is inserted into the open cover, the disc 26 of the outer end closure means is shoved to one side so that the prongs of the electrical plug 14 may be inserted into the plug-in openings 13 of the receptacle. The cord of this plug will thereafter hold the disc 26 of the outer end closure means in its inoperative position.

Now the hinged half 17 of the cover is moved to its cover-closed position and locking screw 24 rotated to secure the hinged part 17 firmly to the fixed mounted part 16. When the plug is to be removed from the cover, it is a simple matter to open the cover, remove the plug, reclose the cover and lock it in its reclosed position. As this is done, the end closure means will automatically move the disc 26 across the cord-accommodating opening of the cover and thereby prevent access to the interior of the cover. The stop member 29 prevents the operatively positioned disc 26 from being pushed inwardly toward plate 11.

Having described my invention, I claim:

1. A safety cover which is particularly suited for use over an escutcheon plate having an aperture for exposing an electrical outlet receptacle which has openings to receive the prongs of an electrical plug, comprising:
   (A) means forming complementary parts of a dome-shaped cover, having
      (1) inner and outer ends,
      (2) an open mouth at its inner end,
      (3) an interior large enough to house the plug for a plate-exposed electrical outlet receptacle, and
      (4) an outer-end opening to accommodate the cord of a housed plug, said opening being formed by at least two of said complementary parts;
   (B) means for mounting said cover on said plate with its open mouth end adjacent said plate aperture, said means including
      (1) means for mounting one of said two complementary cover parts firmly on said plate, and
      (2) means for hingedly mounting the other of said two complementary cover parts for movement relative to said one mounted cover part
         (a) from a cover closed position, in which it cooperates with said one mounted cover part to provide said interior for housing a plug,
         (b) to a cover open position, in which a plug may be plugged into an exposed outlet receptacle or removed therefrom; and (C) means for releasably securing the hinged cover part in said cover-closed position.

2. The cover of claim 1 including:
(A) spring biased means normally closing the outer end opening of the cover when the cover is closed and unoccupied by a plug.

References Cited

UNITED STATES PATENTS

| | | | |
|---|---|---|---|
| 2,462,756 | 2/1949 | Leopold. | |
| 3,159,446 | 12/1964 | Protzmann | 339—82 |
| 3,293,588 | 12/1966 | Blonder | 339—37 |
| 3,363,216 | 1/1968 | Benedetto | 339—39 |

RICHARD E. MOORE, *Primary Examiner.*

J. H. McGLYNN, *Assistant Examiner.*

U.S. Cl. X.R.

339—44, 75